June 24, 1958     D. F. McGILL     2,839,889
GEAR PUMP TYPE HYDRAULIC TRANSMISSION
Filed March 19, 1954     5 Sheets-Sheet 3

INVENTOR
DANIEL F. McGILL
BY
Cook and Schermerhorn
ATTORNEYS

June 24, 1958    D. F. McGILL    2,839,889
GEAR PUMP TYPE HYDRAULIC TRANSMISSION
Filed March 19, 1954    5 Sheets-Sheet 4

INVENTOR
DANIEL F. McGILL

Cook and Schermerhorn
ATTORNEYS

INVENTOR
DANIEL F. McGILL

United States Patent Office 2,839,889
Patented June 24, 1958

2,839,889

GEAR PUMP TYPE HYDRAULIC TRANSMISSION

Daniel F. McGill, Portland, Oreg.

Application March 19, 1954, Serial No. 417,331

9 Claims. (Cl. 60—19)

This invention relates to an improved transmission mechanism for transmitting power through a fluid medium from a driving shaft to a driven shaft in different speed and torque ratios.

The invention is an improvement over the various embodiments disclosed in my copending application, Serial No. 387,609, filed October 22, 1953, now Patent No. 2,807,134, issued September 24, 1957, which application is a division of my application Serial No. 93,691, filed May 17, 1949, now Patent No. 2,658,343, issued November 10, 1953. The said patents relate to a positive displacement type of fluid transmission having radial blade pump and motor components connected in hydraulic circuits and controlled by valves to bring different numbers of units in one of the components into operation to vary the transmission ratio. Another feature of the previous embodiments is that the pump and motor components are constructed and arranged to be hydraulically locked together to revolve as a unit in direct drive, thereby eliminating all fluid pumping and fluid friction losses under the direct drive condition which prevails most of the time in ordinary motor car operation. These same features and advantages are found in the present device, in addition to certain new features and advantages resulting from the novel and improved construction of the present device.

The general objects of the present invention are to provide a compact and efficient transmission which avoids the losses inherent in conventional fluid transmissions, as well as conventional gear shift transmissions, resulting from improper shifting and running in unsuitable transmission ratios; and to provide a transmission that is capable of transmitting power with a smooth drive throughout all speed and ratios including the intervals of changing ratios.

An important object is to provide a fluid transmission in which the entire input torque of the driving member is applied directly to the driven member throughout all speed ratios including direct drive or 1:1 speed ratio.

Particular objects are to effect a positive displacement of fluid in the transmission of power wherein the driving and driven shafts are positively interconnected in different driving ratios by an incompressible fluid medium without slippage, and to provide a positive displacement fluid transmission having reaction members mounted concentrically with driving and driven members to rotate as a unit with the driving and driven members in direct drive without any relative movement between the different parts of the transmission and without any pumping of the fluid therein.

Another object is to provide a transmission of the type described in which different driving ratios and direct drive are established by the operation of a novel valve mechanism which selectively controls or prevents the circulation of the transmission fluid whereby the actual torque ratio at any instant adjusts itself automatically in response to the load on the engine.

Another object is to provide a fluid transmission that will operate in direct drive throughout all lower speeds when the torque requirements are such that the engine can handle the load.

Another object is to provide a transmission having a variable displacement component with a plurality of reaction members which may be included in the fluid circuit in variable number to apply reaction torque to the driven member in addition to the torque applied directly by the driving member.

Further objects are to provide a transmission mechanism of the type described in which the desired torque may be transmitted without building up excessive fluid pressure while in direct drive, and in which the fluid pressure may be increased to obtain higher torque ratios when the transmission is operating in ratio drive.

Another object is to provide a transmission mechanism of the type described having a pressure chamber and pressure ports confined within a combined pump and motor housing to obviate the necessity for fluid pressure seals within the pump and motor components.

A further object is to provide a fluid transmission mechanism of the type described having a positive overrunning connection between the driving and driven shafts in all transmission ratios whereby the engine of a vehicle equipped with such transmission may be started by slowly pushing the vehicle the same as with a conventional sliding gear transmission.

Another object is to provide a transmission in which the necessary service adjustments are all on the outside of the transmission and which will require very little servicing.

A still further object is to provide an automatic control mechanism for use on an automotive vehicle or other application involving an internal combustion engine for gradually changing the driving ratios of the transmission under different conditions encountered in use to effect an entirely automatic transmission.

The present transmission comprises a driving member, a driven member, and a plurality of reaction members all rotatably mounted and concentrically arranged so that the outermost member serves both as the driving member and as an external reservoir casing for the fluid in the transmission. Within this casing an internal housing forming a part of the driven member encloses the hydraulic pump and motor units. The reaction members form a part of the motor units and are mounted on a stationary element that extends outside the transmission. Direct drive is effected by closing certain valves to prevent fluid circulation within the transmission, producing a hydraulic lock to cause all members of the transmission to rotate in unison on the mentioned stationary element, and thereby establish, in effect, a direct mechanical connection between the driving and driven shafts.

The driving and driven members are arranged to cooperate to form a multiple unit positive displacement pump component, and the driven member and reaction members are arranged to cooperate to form a multiple unit hydraulic motor component. By the operation of suitable valve means the pump output may be turned directly into the reservoir to interrupt the driving connection, the pump outlet may be closed to effect the direct drive condition just mentioned, or the pump output may be directed into different numbers of the hydraulic motor units for varying the relative displacement and hence the mechanical advantage or driving ratio between the pump and motor components.

The invention includes an automatic mechanism for operating control valves in response to the load on the engine. This mechanism comprises a solenoid with a novel arrangement of vacuum units, springs and centrifugal governor which cooperatively react to the speed and engine intake manifold pressure to change the position of the control valves without manual attention.

Additional objects and advantages will become apparent and the invention will be better understood with reference to the accompanying drawings illustrating a preferred embodiment of the invention. Various changes may be made in the construction and arrangement of parts and certain features may be used without others. All such modifications within the scope of the appended claims are included in the invention.

Pump and motor components

Figure 1:
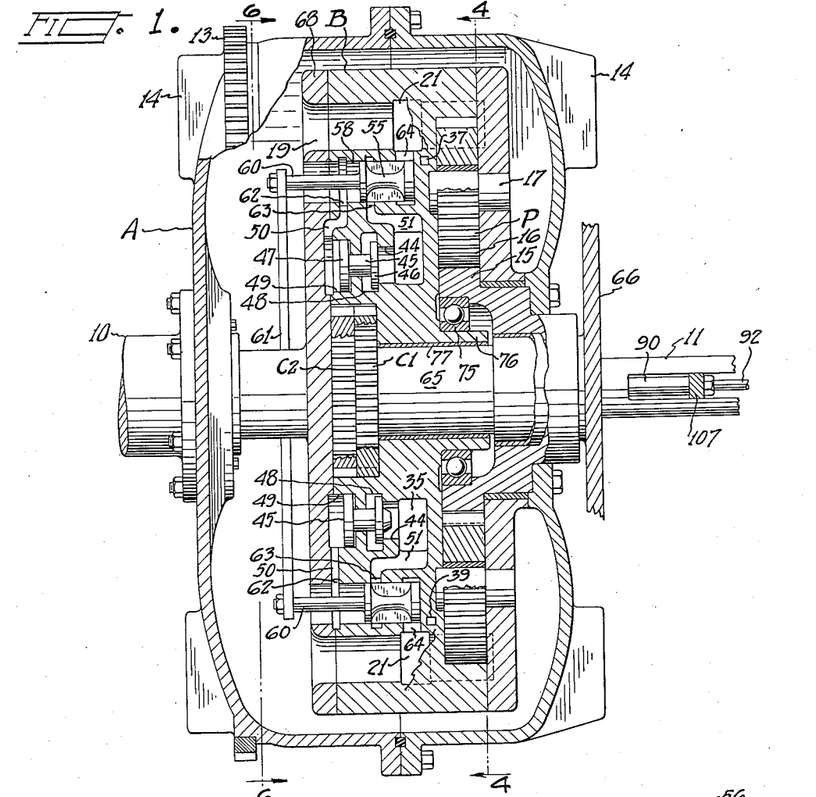
Figure 1 is a longitudinal sectional view of the transmission taken approximately on the line 1—1 of Figure 5.
Figure 4:
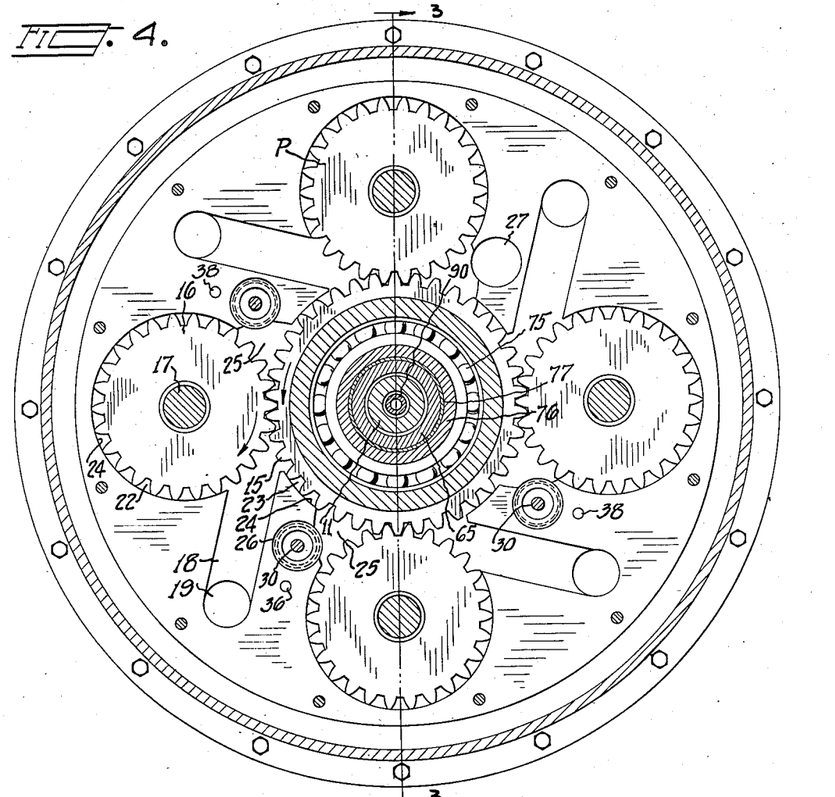
Figure 4 is a cross sectional view taken on the line 4—4 of Figure 1, showing the pump component.
Figure 5:
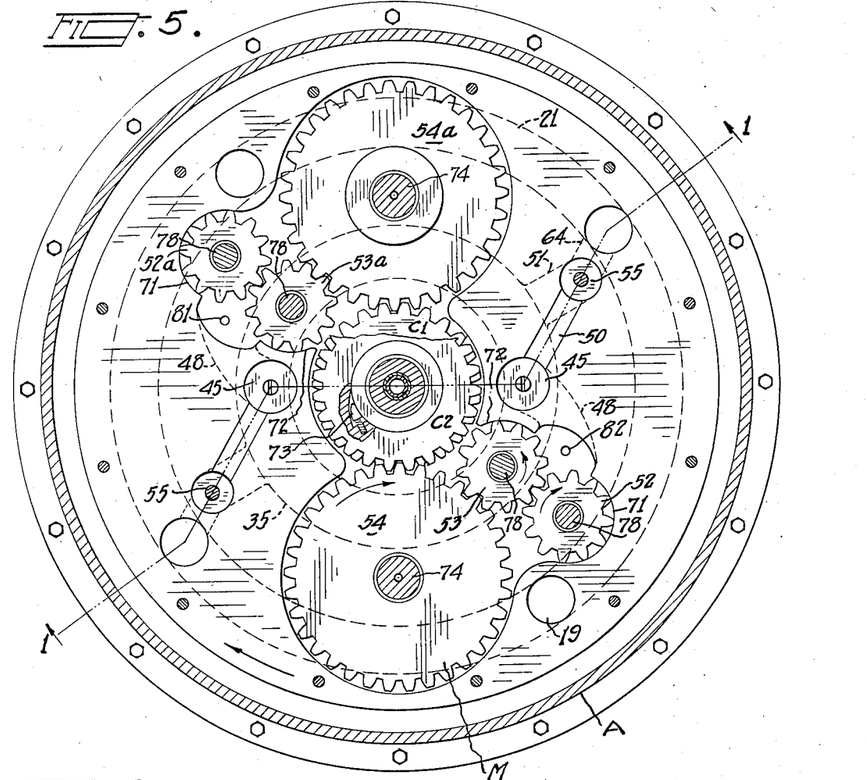
Figure 5 is a cross sectional view taken on the line 5—5 of Figure 3, showing the motor component.
Figure 6:
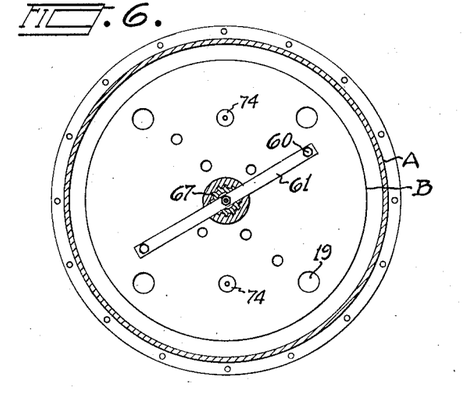
Figure 6 is a cross sectional view taken on the line 6—6 of Figure 1.

Referring particularly to Figure 1, the transmission is interposed between a driving shaft 10 and a driven shaft 11. Drive shaft 10 is connected with a casing A which forms a fluid reservoir for the transmission and also constitutes a part of what will hereinafter be referred to as the driving member. Within the casing A is a housing B connected with the driven shaft 11 and hereinafter referred to as the driven member. The gears C¹ and C² constitute reaction members. Within the housing B of the driven member is a pump component P (Figure 4) and a motor component M (Figure 5). The pump component P comprises four identical pump units, and the motor component M comprises two identical motor units, all of the pump and motor units embodying the gear pump principle of operation. The casing A is equipped with the usual starting ring gear 13, and it may also be provided with cooling fins or fan blades 14.

The driving member and outer casing A is connected with a driving sun gear 15 meshing with the four pump gears 16 in pump component P. Each pump gear 16 is mounted on a stub shaft 17 in the housing or driven member B. Relative rotation of the pump gears 15 and 16 in the directions of the arrows in Figure 4 draws transmission fluid into pump inlet passages 18 and 19, the latter communicating with the reservoir space inside casing A. These intake passages are further interconnected by an annular passage 21, as shown in Figure 1.

Figure 3:
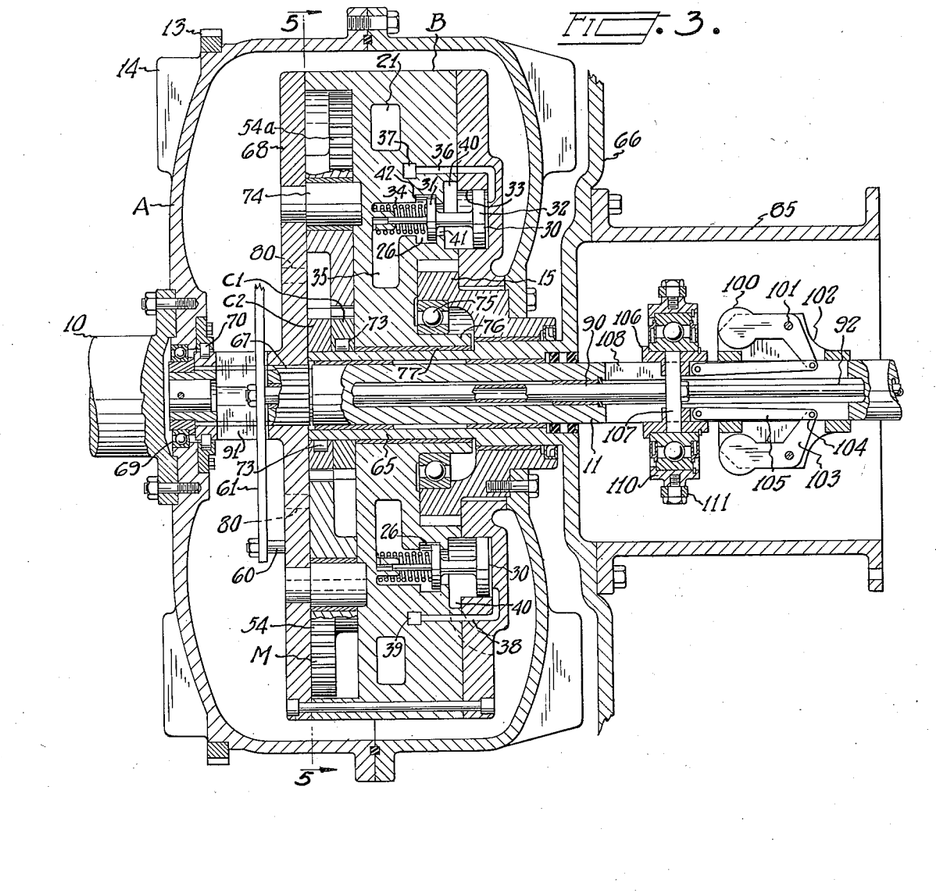
Figure 3 is a longitudinal sectional view taken approximately on the line 3—3 of Figure 4.

The rotation of the pump gears 15 and 16, as described, carries transmission fluid in the tooth spaces 22 and 23 bounded by arcuate walls 24 in the housing B to the pump outlet or pressure chambers 25. Three of the pump outlet chambers 25 are in communication with valve chambers 26, as shown in Figures 3 and 4, and the fourth pump outlet chamber communicates with an open bore 27, as shown in Figure 4. There are three pump valves 30 having valve discs 31 disposed in the three valve chambers 26. These valves have a spool shape with a larger disc 32 forming a piston in a short cylinder 33. The valves are biased to the position shown in Figure 3 by springs 34. In this position the valve chambers 26 are placed in communication with annular pump discharge or pressure chamber 35. The end of one cylinder 33 is connected with a passage 36 leading to an arcuate passage 37, and the end of the other two cylinders 33 is connected with a passage 38 leading to an arcuate passage 39. The admission of fluid pressure into these arcuate passages shifts the pump valves 30 against spring tension, moving the valve discs 31 to the left, as viewed in Figure 3, to break communication between valve chamber 26 and annular pressure chamber 35 and open communication between these valve chambers and relief passages 40 leading to the reservoir in casing A.

Referring again to Figure 1, the pump outlet or pressure chamber 35 communicates through ports 44 with a pair of motor valves 45. The valves 45 are free floating under the actuation of fluid pressure on their opposite sides, each valve having a stem with a small valve disc 46 on one end and a larger piston 47 on the other end. Valve disc 46 moves in a motor pressure chamber 48 and piston 47 moves in a short cylinder 49 communicating with a passage 50. Pump pressure chamber 35 also communicates with passages 51.

Figure 2:
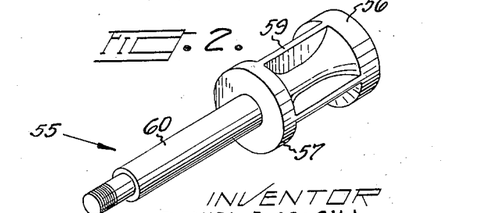
Figure 2 is a perspective view of one of the control valves shown in Figure 1.

The position of motor valves 45 is determined by a pair of exteriorly actuated control valves 55 (Figure 2). The valves 55 are balanced spool valves having spaced valve discs 56 and 57 slidable in a cylindrical bore 58 by means of valve stems 60 which protrude forwardly from the housing B. Longitudinal fins 59 hold the discs 56 and 57 centered in the bore 58 in passing a number of port holes. The valve stems 60 are interconnected by a bar 61 for movement in unison by a control mechanism to be hereinafter described. The passages 50 and 51 communicate with the valve bore 58 through ports 62 and 63, respectively. Pump intake passage 21 communicates through port 64 with the inner end of bore 58. For a reason to be explained later, the ports 62 and 63 are spaced differently in the two valve bores 58. The two valves 55 are identical.

One of the motor pressure chambers 48 provides an inlet chamber for a pair of fluid motor gears 52, 53 and the other chamber 48 provides an inlet chamber for a pair of fluid motor gears 52a, 53a. Gear 53 meshes with a larger gear 54 which in turn meshes with the reaction gear C². Gear 53a meshes with a larger gear 54a which in turn meshes with the reaction gear C¹. The gear 54 has the same thickness as reaction gear C² and is disposed in a common plane therewith. The gear 54a has the same thickness as the reaction gear C¹ and is disposed in a common plane therewith (Figures 3 and 5). Gears 52, 53, 52a, 53a, have a thickness equal to the combined thickness of both reaction gears C¹ and C² in Figure 3.

The pressure of fluid introduced into motor inlet chambers 48 reacts against the teeth of the motor gears, 52 and 53a, for example, causing these teeth to sweep around the arcuate walls 71 and 72, tending to produce rotation of these gears in the directions indicated by the arrows. The areas adjacent walls 71 and 72 exposed to such pressure are equal to the areas of two teeth. The pressure acting on the meshing teeth of gears 52, 53 tends to oppose the indicated rotation, but, since this pressure acts on a surface approximately equal to the area of only a single tooth, the net rotating force which is applied to the gear 54 as torque is approximately equal to the unit fluid pressure multiplied by the area of a single tooth. In a similar manner the fluid motor gears 52a and 53a drive the gear 54a.

Reaction gears C¹ and C² are restrained against counterclockwise rotation in Figure 5 by conventional one-way brake elements 73 shown in Figure 3, whereby these gears may function as fixed fulcrum points for increasing the leverage and hence the mechanical advantage which may be obtained from the fluid pressure exerted on the motor gears 52, 53, 52a, 53a.

Gears 54 and 54a are mounted on short stub shafts 74 in the housing B, whereby torque applied to these planet gears tends to cause them to wheel around the stationary sun gears C¹ and C² in planetary motion, carrying the housing B along with the planet shafts 74. Under certain conditions of operation, to be described hereinafter in greater detail, the overrunning brake means 73 permit the sun gears C¹ and C² to rotate in a forward direction with the gears 54 and 54a and housing B when the whole planetary assembly revolves as a unit in direct drive. Fluid motor gears 52, 53, 52a, 53a are mounted on stub shafts 78 in housing B.

Figure 11:
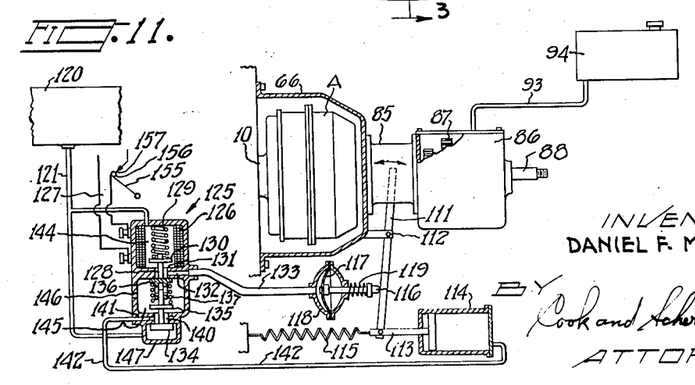
Figure 11 is a general view of the transmission including the control mechanism.

Additional details of the mechanical construction are shown in Figure 3. The reaction gears C¹ and C² and their overrunning brake elements 73 are mounted on the forward end of a stationary tube 65 carried by an external bell housing 66 which surrounds the casing A as shown in Figure 11. Output shaft 11 passes through the tube 65 and has a splined connection at 67 with the end plate 68 of housing B. This end plate has discharge ports 80 for the motor units just described. The extreme forward end of driven shaft 11 is supported by a pilot bearing 69 at the rear end of drive shaft 10. Overrunning clutch elements 70 prevent the driven shaft 11 from rotating faster than drive shaft 10 in a forward direction, so that in a vehicle the engine may be started by pushing the vehicle. The rear end of housing B is maintained in true concentric position by means of a bearing 75 between the gear 15 and a sleeve 76 on the housing. Sleeve 76 is mounted on a bearing 77 on the stationary tube 65.

Mounted on the rear end of bell housing 66 is a governor housing 85. When a reverse drive is necessary, as in an automobile, a gear box 86 having a reversing gear 87 is mounted on the rear end of the governor housing 85, as shown in Figure 11. The driven shaft 11 extends through the governor housing and into gear box 86 and a final driven shaft 88 then lead to the driving axle of the vehicle. Gear box 86 contains elements for providing direct drive, neutral and reverse drive between the shafts 11 and 88 as will readily be understood by persons skilled in the art without illustrating the details of such mechanism. The particular form of mechanism in box 86 is immaterial to the present invention as a conventional component would perform the necessary functions.

The bar 61 connected with the control valves 55 in Figure 1 is mounted on the front end of a thrust tube 90 disposed within the driven shaft 11. The front end of shaft 11 is slotted at 91 for longitudinal movement of the bar 61, in order to move the control valves 55 to different positions. Thrust tube 90 is also utilized to provide fluid connection between the reservoir in casing A and an external expansion chamber 94 which is arranged to keep the casing completely filled with the hydraulic fluid and for refilling. For this purpose, the forward end of thrust tube 90 opens into the casing A within the slot 91 and its rear end is connected with a tube 92 which extends out of the rear end of driven shaft 11 within the gear box 86. Tube 92 is connected with a pipe 93 by means of a suitable rotary coupling, and the latter pipe communicates with expansion chamber 94 in Figure 11.

Control system

The centrifugal governor is illustrated in Figure 3 and the rest of the control system is shown in Figure 11. A pair of fly weights 100 are pivotally mounted at 101 on a fitting 102 on the driven shaft 11 within the housing 85. Fly weights 100 have bell crank arms 103 pivotally connected at 104 with links 105 to impart longitudinal movement to a sliding collar 106 as the position of the weights changes with variations in speed of the driven shaft. Collar 106 is equipped with a diametral cross bar 107 traveling in a slot 108 in the shaft and connected with the rear end of thrust tube 90.

A non-rotating thrust ring 110 mounted on bearings on collar 106 engages the upper end of an external lever 111 which is pivoted at 112 on a fixed support on the bell housing 66. The lower end of lever arm 111 is connected with the piston rod 113 of a vacuum cylinder 114. A tension spring 115 is connected with the piston rod to bias the parts toward the position shown. Lever 111 may be referred to as a control arm.

When the lower end of control arm 111 is thus pulled to the left by spring 115, the arm engages a plunger 116 connected with a diaphragm 117 in a diaphragm chamber 118. Spring 119 biases the plunger 116 to the right to serve as a resilient stop for the arm 111, the travel of the plunger being shorter than the travel of the arm. The right side of diaphragm 117 is exposed to atmospheric pressure.

The numeral 120 in Figure 11 designates the intake manifold of the internal combustion engine which drives the vehicle carrying the transmission and control mechanism illustrated. Pipe 121 from the manifold has two branches connecting with a solenoid valve, designated generally by the numeral 125. The valve 125 comprises a winding 126 energized by a circuit through the wires 127, and a magnetic valve plunger 128. Plunger 128 is biased downwardly by spring 129, tending to seat an upper valve disc 130 on a port 131 concentric with the plunger. Disc 130 is smaller in diameter than the cylindrical bore which houses it within the solenoid coil 126, permitting air to pass freely around the edges of the disc when it is raised above port 131, as shown. Connected in the wall of port 131 is a lateral port 132 connected with a pipe 133 leading to the diaphragm chamber 118.

Solenoid plunger 128 further carries a bottom valve disc 134 and a pair of intermediate valve discs 135 and 136. The latter is slidably mounted on plunger 128 and urged upwardly against the lower side of port 131 by the action of spring 137 which abuts against the valve disc 135. The valve discs 134 and 135 are disposed on opposite sides of a wall having a port 140 concentric with the plunger 128. The wall of port 140 is equipped with a lateral port 141 connected with a pipe 142 leading to the vacuum cylinder 114.

The housing and port walls in the solenoid valve unit 125 thus define an upper chamber 144 connected with the vacuum pipe 121, a middle chamber 145 having an atmospheric air inlet 146, and a lower chamber 147 also connected with the vacuum pipe 121. The lateral ports 132 and 141, being disposed in walls between these chambers, may be connected to the chambers immediately above or below the lateral ports, according to the position of the valve discs on solenoid plunger 128.

Solenoid circuit 127 is energized when the engine is idling by means of a switch associated with the throttle pedal 155. In idling position of the throttle pedal, a contact 156 on the pedal engages a stationary contact 157, but this circuit is broken when the throttle is opened to running position.

Operation

When the engine is idling, the energization of solenoid circuit 127 by throttle pedal 155 places the control mechanism in the condition illustrated in Figure 11. Solenoid plunger 128 is raised, unseating the valve discs 130 and 135 and seating the valve discs 136 and 134. Vacuum cylinder 114 is thereby connected with atmosphere and diaphragm chamber 118 is connected with engine intake manifold vacuum. Under these conditions spring 115 pulls the lower end of control arm 111 to its extreme left position, stop 116 being retracted against spring 119 by the diaphragm 117. This position of control arm 111 holds thrust ring 110 and collar 106 in the extreme right or rearward position, as shown in Figure 3, the fly weights 100 being held in fully retracted position by the spring 115. It is assumed now that the vehicle is standing still, about to be started, driven shafts 11 and 88 being stationary and driving shaft 10 rotating at idling speed.

Figure 7:
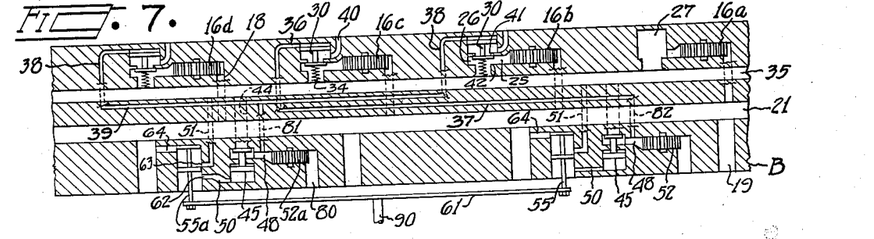
Figure 7 is a schematic development, in section, showing the various valves in neutral or non-driving position.

The control valves 55 are thereby fully retracted in a rearward direction, causing the pump and motor valves to assume the positions illustrated in Figure 7. This is referred to as the "neutral" or non-driving position. The pump valves 30 are held in raised positions by springs 34, with ports 41 open and ports 42 closed, causing the four pump units 16 to discharge into annular pressure channel 35. For convenience of identification, the pump units and valves in Figures 7 to 10 are distinguished individually by subscripts added to the reference numerals employed in the other views. From annular pressure chamber 35 the pump discharge is relieved to the reservoir in casing A and recirculated back to pump intake channel 21 by means of passages 51 and 64. The position of motor valves 45 is immaterial because the pump output is incapable of developing working pressure in pressure chamber 35 and the motor units.

When the throttle is partially opened to running position, the solenoid circuit 127 is broken, deenergizing solenoid 126 and allowing spring 129 to shift the solenoid plunger and valve stem 128 to its lower position. This places diaphragm chamber 118 in communication with atmosphere and vacuum cylinder 114 in communication with intake manifold vacuum, the degree of vacuum depending upon the suddenness and extent to which the engine throttle is opened. Piston rod 113, therefore, stretches the spring 115, moving the lower end of control arm 111 a short distance to the right in Figure 11. This movement is assisted by spring 119 moving the stop 116 to the right as soon as atmospheric pressure is admitted behind diaphragm 117. During this phase of operation, however, driven shaft 11 is either stationary or revolving very slowly so that the fly weights 100 do not lend any assistance in moving the upper end of control arm 111 and collar 106 to the left. Therefore, in a normal start, control tube 90 and control valves 55 are moved forward initially only a slight amount, causing them to assume the position shown in Figure 8.

Figure 8:
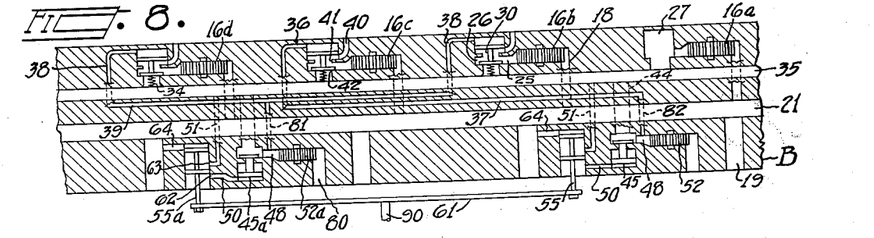
Figure 8 is a similar view showing the positions of the valves in the first step or high ratio position.

Figure 8 illustrates the positions of the parts in the first stage of acceleration from a standstill. It will be observed that the valve discs 56 have now closed the ports 64, terminating the pump discharge flow through passages 51. This establishes substantial pump discharge pressure in pressure chamber 35, depressing the motor valves 45 and communicating this pressure and discharge flow to the motor units 52 and 52a, causing them to begin operation. Pump pressure is also communicated through passages 81, 39, 38, and 82, 37, 36, to the closed ends of cylinders 33 behind the pump valves 30, forcing these three valves down until valve discs 31 seat on ports 42, preventing the discharge from the three pump units 16b, 16c and 16d from entering the pressure chamber 35. The discharge from the three valve equipped pump units then escapes to the reservoir in casing A through the relief passages 40. The fourth pump unit 16a discharges at all times into the empty bore 27 which is always in communication with the pressure chamber 35. The two motor units 52 and 52a are thereby supplied in parallel from the single pump unit 16a.

Because the sections in Figures 4 and 5 are viewed from opposite ends of the transmission, the forward reaction torque thus developed by the motor component is clockwise in Figure 5, while the forward reaction torque developed in the pump component in Figure 4 is counterclockwise. It has previously been explained how the counterclockwise rotation of driving gear 15 in the pump (Figure 4) tends to impart a planetary movement to the pump gears 16, producing a reaction on the stub shafts 17 which apply a counterclockwise torque to the housing B when resistance is imposed upon the delivery of fluid from the pump units. When such fluid under pressure enters the motor component (Figure 5), the fluid can escape from the two motor units only by rotating the motor gears 52, 53 and 52a, 53a in the directions indicated by the arrows. The reaction gears $C^1$ and $C^2$ being constrained against reverse rotation by the overrunning brake elements 73, the gears 54 and 54a are forced to travel around the reaction sun gears in planetary motion, the tendency for such motion being exerted through the stub shafts 74 to apply clockwise torque to the housing B, in Figure 5.

The torque and speed developed in the motor component depend upon the size and number of teeth in the two reaction gears $C^1$ and $C^2$, all the gears in the motor component having the same tooth form to mesh together as shown. Neglecting losses, the displacement volume of liquid passed by the motor gears 52 and 53, for example, in producing one revolution of stub shaft 74 around the axis of the reaction sun gears $C^1$ and $C^2$, is independent of the diameters of gears 52, 53 and 54. The size of gears 52 and 53 does not affect the number of revolutions of planet carrier B necessary to handle a given volume of liquid from the pump and also does not affect the mechanical leverage exerted upon the housing B through the stub shafts which support the gears. The size of gears 54 and 54a determines the length of the lever arms through which stub shafts 74 act in exerting the motor reaction torque on the housing B. Assuming a given radial depth of tooth, the number of teeth on reaction gears $C^1$ and $C^2$, and hence their diameter, determines the volume of fluid which must be passed through the motor gears to produce one revolution of driven member B around the stationary reaction gears. When motor gear 52 has twelve teeth, as shown, one revolution of that gear will advance gear 54, and hence driven member B, twelve teeth around the reaction gear $C^2$.

Figure 9:
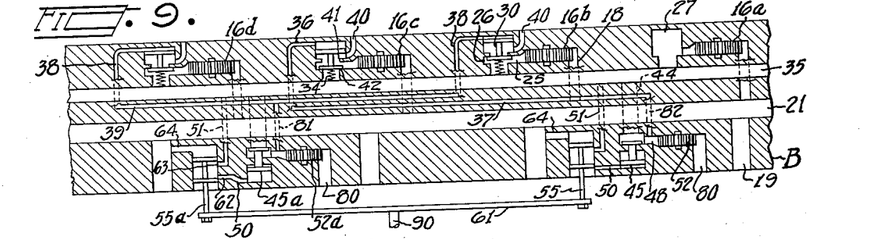
Figure 9 is a similar view showing the positions of the valves in a second step or intermediate ratio position.

As the vacuum increases in cylinder 114 (Figure 11) and the speed of driven shaft 11 increases, the piston rod 113 and the fly weights 100 (Figure 3) tend to shift the thrust tube 90 slightly farther forward, moving the control valves 55 to the position shown in Figure 9. In Figure 9 it will be observed that the control valve 55a has moved its disc 57 outward of the port 62, whereby pump pressure from one of the passages 51 is directed into passage 50 to shift the motor valve 45a into closed position to shut off the fluid pressure supply for the motor unit 52a. This motor unit becomes inactive and, at the same time, the removal of pressure from the passages 81, 39, 38, 38 allows the springs 34 to shift two of the pump valves 30 and divert the output of the two pump units 16b and 16d into the pressure chamber 35 in addition to the output of the pump unit 16a which is always connected with pressure chamber 35 through the open bore 27. Thus, in Figure 9, the pump units 16a, 16b and 16d together supply the single motor unit 52 to produce a different transmission ratio.

Figure 10:
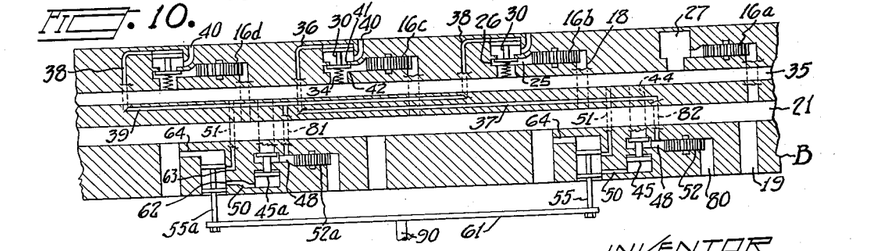
Figure 10 is a similar view showing the positions of the valves in direct drive.

Upon the attainment of either a higher speed or a higher degree of vacuum in the engine manifold, the fly weights 100 or the piston rod 113, acting individually or in unison, will shift the control tube 90 still farther forward to move control valves 55 to the extreme forward position illustrated in Figure 10. This position of the control valves puts the transmission in direct drive with 1:1 torque and speed ratio. Both ports 62 are now in communication with ports 63 to cause the motor valves 45 and 45a to shut off the pump discharge in pressure chamber 35 from entering both motor units 52 and 52a. The operation of the motor valve 45 associated with the motor unit 52 removes fluid pressure from the passages 82, 37, 36 leading to the pump valve 30 for pump unit 16c whereby all four pump units then discharge directly into the pressure chamber 35, from which the discharge fluid cannot escape. This condition produces a hydraulic lock in which the four pump gears 16 cannot rotate on their stub shafts 17 but must carry the housing B around with the driving gear 15. In the motor component (Figure 5), the gears may also remain stationary and thereby avoid friction losses by reason of the fact that overrunning brake elements 73 permit the reaction sun gears C¹ and C² to revolve in a forward direction on the stationary supporting tube 65. Driven shaft 11 is thereby caused to rotate at the same speed as drive shaft 10 with all the gears in housing B remaining stationary relative to each other.

An increase in load will produce a downshift to the second stage, illustrated in Figure 9, or possibly even the first stage, illustrated in Figure 8, upon a sufficient reduction in vacuum in the vacuum cylinder 114 or retraction of fly weights 100 in response to reduced speed. Both of these conditions tend to shift the thrust tube 99 rearwardly to the right as viewed in Figure 3.

When the operator's foot is removed from accelerator pedal 115, circuit 127 is reenergized to actuate the solenoid valve unit 125 and return the various valves to the neutral positions shown in Figure 7, except to the extent that this position of control valves 55 is altered by reason of the partial extension of fly weights 100 at fairly high speeds of the vehicle. If the vehicle is coasting faster than idling speed the engine will be driven by the driven shaft 11 through the overruning clutch elements 70.

It will be apparent that additional intermediate steps may be provided, if desired. Different numbers of pump and motor units may be placed in active fluid circuits at different times by suitable rearrangements of the valves and ports within the scope of the invention. Except when the valves are in the neutral position shown in Figure 7, the pump component develops driving torque at all times, the driving effort contributed by the pump component increasing through the different stages until it may be said that the pump component furnishes all the driving torque in the direct drive position shown in Figure 10. A smooth start from a standstill is assured by the gradual throttling action of the valve discs 56 of control valves 55 as they move past discharge ports 64 in shifting from the Figure 7 to the Figure 8 positions. In the various possible intermediate steps, in addition to Figures 8 and 9 which are merely exemplary, driving torque is developed by reaction of the fluid pressure in both the pump and motor components.

The pump is designed to pump a large volume of fluid so that when it is locked in direct drive (Figure 10) with no pumping of the fluid, the fluid pressure necessary to transmit the entire torque of the engine is relatively low. When a high torque ratio is called for, the volume of pumped fluid is reduced by cutting three of the pumps out of the system, whereby higher fluid pressures may be produced in the hydraulic motors (Figure 8). Thus, the division of the load between the pump and motor components may vary, but under all conditions the torque which is delivered to the driven shaft is the sum of the torques developed in the pump and motor components. A feature of advantage is that all frictional drag in the pump component develops useful torque in the housing B which is transmitted directly to the driven shaft.

Abnormal torque requirements, such as may occur in heavy trucks, may be satisfied without creating excessive fluid pressures by making the motor gears thicker to provide larger areas on the fluid motor gear teeth exposed to the fluid, and also by increasing the diameter of the housing B to lengthen the lever arm distance of the stub shafts 74 from the axis of the reaction sun gears C¹ and C².

Having now described my invention and in what manner the same may be used, what I claim as new and desire to protect by Letters Patent is:

1. A fluid transmission for an engine having an intake manifold comprising a plurality of positive displacement fluid pump units and a plurality of positive displacement fluid motor units arranged to be driven by said pump units, a plurality of passages and a control valve for directing the discharge from a variable number of said pump units into a variable number of said motor units to alter the speed and torque ratio of the transmission, a speed responsive governor connected with said driven member for shifting the position of said control valve, vacuum means responsive to the intake manifold pressure of the engine for altering the control exerted by said governor, a spring opposed to said vacuum means, vacuum means responsive to the intake manifold pressure of the engine for altering the control exerted by said spring, a solenoid valve controlling the operation of both of said vacuum means, and a switch connected with the engine throttle controlling said solenoid valve.

2. In a transmission, an input shaft and an output shaft, a stationary member, a fluid reservoir connected with said input shaft and mounted for rotation on said stationary member, a housing in said reservoir connected with said output shaft and mounted for rotation on said stationary member, a gear in said housing connected with said fluid reservoir, gears in said housing meshed with said first gear and forming a pump, a pressure chamber in said housing, a port from said pump to said pressure chamber, a port from said pump to said reservoir, a fluid pressure actuated pump valve mounted for movement in said housing to two different positions to close said port to said pressure chamber or said port to said reservoir, a gear mounted on an overrunning brake on said stationary member, an hydraulic gear motor in said housing, a gear meshed with said overrunning brake gear and a gear of said hydraulic motor, a port in said housing from said pressure chamber to said hydraulic motor, a fluid pressure actuated motor valve mounted in said housing to close said port, a control valve mounted in said housing, a port from said control valve to said pressure chamber, a port from said control valve to operate said hydraulic motor valve, a port from said control valve communicating with said reservoir, means to operate said control valve, and a port from said control valve to operate said pump valve.

3. In a transmission, an input shaft and an output shaft, a stationary member, a fluid reservoir connected with said input shaft and mounted for rotation on said stationary member, a housing in said reservoir connected with said output shaft and mounted for rotation on said stationary member, a pump comprising gears mounted in said housing and on said fluid reservoir, an hydraulic motor comprising gears mounted on said housing, a pressure chamber in said housing, ports from said pump to said pressure chamber and said reservoir, valves in said housing movable to different positions to close either the pressure chamber ports or the fluid reservoir ports, fluid pressure actuated means to control said valve, control valve means to control said fluid pressure actuated means, ports from said pressure chamber to said hydraulic motor, motor valves for closing said motor ports, fluid pressure actuated means controlled by said control valve means to operate said motor valves, an overrunning brake mounted on said stationary member, a gear mounted on said overrunning brake, and a gear meshing with one of said motor gears and said overrunning brake gear to cause said housing to rotate around said stationary member by operation of said fluid motor.

4. In a transmission, an input shaft and an output shaft, a stationary member, a fluid reservoir connected with said input shaft and mounted for rotation on said stationary member, a housing in said reservoir connected with said output shaft and mounted for rotation on said stationary member, a pump comprising gears mounted in said housing and on said fluid reservoir, an hydraulic motor comprising gears mounted in said housing, a pressure chamber in said housing, ports from said pump to said pressure chamber and fluid reservoir, valves in said housing mounted for movement to different positions to close either said pressure chamber ports or said fluid reservoir ports, means to operate said valves, ports from said pressure chamber to said hydraulic motor, valves for closing said hydraulic motor ports, means to operate said valves, an overrunning brake mounted on said stationary member, a gear mounted on said overrunning brake, and a gear meshing with said overrunning brake gear and one of said motor gears to cause said housing to rotate around said stationary member by operation of said motor.

5. In a transmission, an input shaft and an output shaft, a stationary member, a fluid reservoir connected with said input shaft and mounted for rotation on said stationary member, a housing in said reservoir connected with said output shaft and mounted for rotation on said stationary member, a pump comprising gears mounted on said housing and on said fluid reservoir, an hydraulic gear motor mounted on said housing, a pressure chamber in said housing, a port from said pump to said pressure chamber, a port from said pump to said fluid reservoir, fluid pressure actuated pump valves in said housing movable to different positions to close either said pressure chamber ports or said fluid reservoir ports, ports leading from said pump valves to said hydraulic motor ports to actuate said pump valves, ports from said pressure chamber to said hydraulic motor, fluid pressure actuated motor valves in said hydraulic motor ports, control valves, means to operate said control valves and means operable by said control valves to actuate said hydraulic motor valves, an overrunning brake mounted on said stationary member, a gear mounted on said overrunning brake, and a gear meshing with said overrunning brake gear and one of said motor gears to cause said housing to rotate around said stationary member by operation of said motor.

6. In a transmission, an input shaft and an output shaft, a stationary member, a fluid reservoir connected with said input shaft and mounted for rotation on said stationary member, a housing in said reservoir connected with said output shaft and mounted for rotation on said stationary member, a pump comprising gears mounted on said housing and on said fluid reservoir, an hydraulic gear motor mounted on said housing, a pressure chamber in said housing, a port from said pump to said pressure chamber, a port from said pump to said fluid reservoir, fluid pressure actuated pump valves in said housing movable to different positions to close either said pressure chamber ports or said fluid reservoir ports, ports leading from said pump valves to said hydraulic motor ports to actuate said pump valves, ports from said pressure chamber to said hydraulic motor, fluid pressure actuated motor valves in said hydraulic motor ports, control valves, and means operable by said control valves to actuate said hydraulic motor valves, an overrunning brake mounted on said stationary member, a gear mounted on said overrunning brake, a gear meshing with said overrunning brake gear and one of said motor gears to cause said housing to rotate around said stationary member by operation of said motor, means outside of said reservoir connected with said control valves, a lever arm connected with said means, a vacuum unit connected to said lever arm tending to hold said control valves in a predetermined position, and a spring connected with said lever arm in opposition to said vacuum unit.

7. In a transmission, an input shaft and an output shaft, a stationary member, a fluid reservoir connected with said input shaft and mounted for rotation on said stationary member, a housing in said reservoir connected with said output shaft and mounted for rotation on said stationary member, a pump comprising gears mounted on said housing and on said fluid reservoir, an hydraulic gear motor mounted on said housing, a pressure chamber in said housing, a port from said pump to said pressure chamber, a port from said pump to said fluid reservoir, fluid pressure actuated pump valves in said housing movable to different positions to close either said pressure chamber ports or said fluid reservoir ports, ports leading from said pump valves to said hydraulic motor ports to actuate said pump valves, ports from said pressure chamber to said hydraulic motor, fluid pressure actuated motor valves in said hydraulic motor ports, control valves, and means operable by said control valves to actuate said hydraulic motor valves, an overrunning brake mounted on said stationary member, a gear mounted on said overrunning brake, a gear meshing with said overrunning brake gear and one of said motor gears to cause said housing to rotate around said stationary member by operation of said motor, means outside of said reservoir connected with said control valves, a lever arm connected with said means, a vacuum unit connected to said lever arm tending to hold said control valves in a predetermined position, a spring connected with said lever arm in opposition to said vacuum unit, and a governor on said output shaft connected to said means to hold said control valves in said predetermined position at a predetermined speed of said output shaft.

8. In a transmission, an input shaft and an output shaft, a stationary member, a fluid reservoir connected with said input shaft and mounted for rotation on said stationary member, a housing in said reservoir connected with said output shaft and mounted for rotation on said stationary member, a pump in said housing comprising a pair of relatively movable pump elements for pumping hydraulic fluid, one of said pump elements being connected with said housing and the other pump element being connected with said fluid reservoir for operation of the pump by relative rotation of said reservoir with respect to said housing, a hydraulic motor comprising a pair of meshing gears mounted in said housing, a pressure chamber in said housing, ports from said pump to said pressure chamber and fluid reservoir, valves in said housing mounted for movement to different positions to close either said pressure chamber ports or said fluid reservoir ports, means to operate said valves, ports from said pressure chamber to said hydraulic motor, valves for closing said hydraulic motor ports, means to operate said valves, an overrunning brake mounted on said stationary member, a gear mounted on said overrunning brake, and a gear meshing with said overrunning brake gear and one of said motor gears to cause said housing to rotate around said stationary member by operation of said motor.

9. In a transmission, an input shaft connected with a driving member, an output shaft connected with a driven member, and a stationary member; said driving member comprising a fluid reservoir mounted for rotation on said stationary member, said driven member comprising a housing in said reservoir mounted for rotation on said stationary member, a pump in said housing having two relatively movable pump elements for pumping hydraulic fluid, one of said pump elements being connected with said housing and the other pump element being connected with said driving member for operation of said pump by the relative rotation of said driving member with respect to said driven member; an overrunning brake mounted on said stationary member, a gear mounted on said overrunning brake, a hydraulic motor in said housing comprising a pair of meshing gears mounted on stub shafts in said housing at a distance from the axis of rotation of the housing, said motor gears having operative geared connection with said overrunning brake gear to rotate said housing by operation of said motor; said housing having ports and passages arranged to deliver hydraulic fluid from said pump to said hydraulic motor and to said reservoir, and valve means in said ports and passages arranged to direct fluid from said pump to said reservoir to interrupt driving connection between said driving and driven members, to direct fluid from said pump to said hydraulic motor for driving said driven member by said hydraulic motor in ratio drive, and to establish hydraulic lock in said pump for locking said driving member to said driven member in direct drive.

(References on following page)

References Cited in the file of this patent

UNITED STATES PATENTS

| | | |
|---|---|---|
| 1,199,904 | Kettler | Oct. 3, 1916 |
| 1,706,272 | Wingquist | Mar. 19, 1929 |
| 1,779,757 | Streckert | Oct. 28, 1930 |
| 1,998,922 | Chamberlain et al. | Apr. 23, 1935 |
| 2,323,926 | McGill | July 13, 1943 |
| 2,359,423 | Johnson | Oct. 3, 1944 |
| 2,529,437 | Weinberger | Nov. 7, 1950 |
| 2,629,332 | Tripp | Feb. 24, 1953 |
| 2,658,343 | McGill | Nov. 10, 1953 |
| 2,680,348 | Wahlmark | June 8, 1954 |

FOREIGN PATENTS

| | | |
|---|---|---|
| 345,523 | Germany | Dec. 12, 1921 |
| 427,956 | Great Britain | May 2, 1935 |